United States Patent [19]
Ray

[11] Patent Number: 4,466,797
[45] Date of Patent: Aug. 21, 1984

[54] TRAINING DEVICE FOR BICYCLISTS

[76] Inventor: Dalph D. Ray, 101 Scholz Plz. #217, Newport Beach, Calif. 92663

[21] Appl. No.: 512,028

[22] Filed: Jul. 8, 1983

[51] Int. Cl.³ .......................... G09B 9/04; A63B 69/16
[52] U.S. Cl. .......................................... 434/61; 272/73
[58] Field of Search ............................ 434/61; 272/73; 297/423; 15/265, 266, 267

[56] References Cited
U.S. PATENT DOCUMENTS
1,925,293 9/1933 Wells ..................................... 15/265
2,238,295 4/1941 Snyder ................................... 272/73

Primary Examiner—William H. Grieb
Attorney, Agent, or Firm—Tom Sherrard

[57] ABSTRACT

A device for use with conventional bike simulators to facilitate improvement in pedaling skills.

3 Claims, 5 Drawing Figures

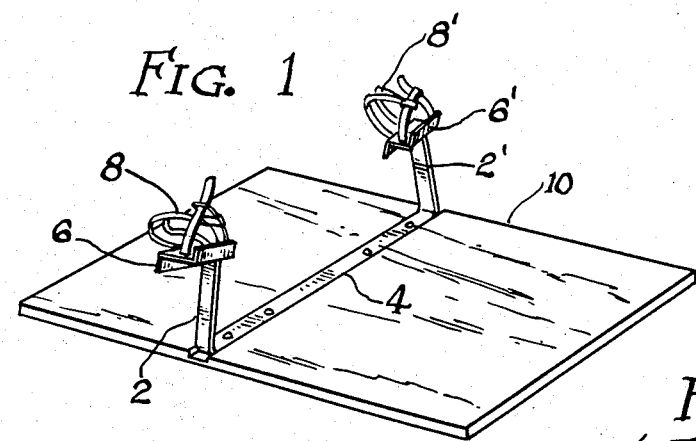
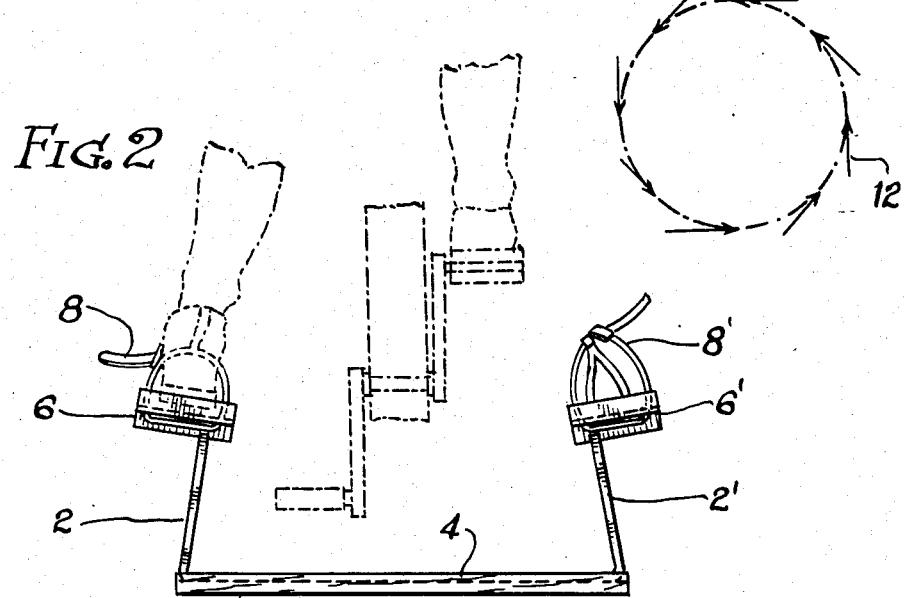
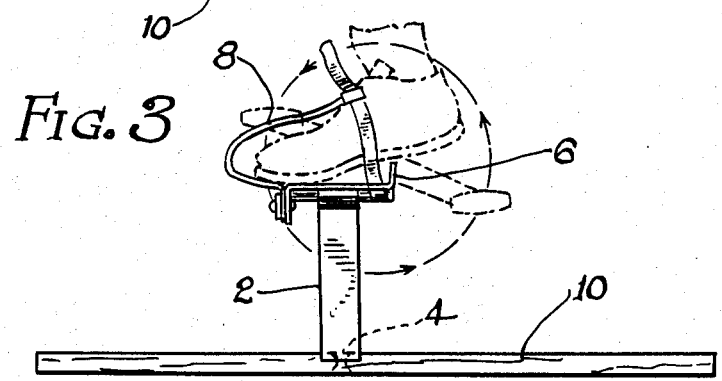

TRAINING DEVICE FOR BICYCLISTS

BACKGROUND OF THE INVENTION

In bicycling, human energy is transmitted directly to the machine. The only link of propulsion between rider and bicyle is his or her feet on the pedals. A substained transmission of power from both feet is most efficient and desirable. However, before my invention there was little practical opportunity for most people to learn truly effective pedaling skills.

Most people naturally condition themselves to apply force only intermittently. Downward pumping action is most common. Power is generated in alternating spurts, from one foot to the other during only part of the pedal rotation. Such "push-push" action is inefficient. To compound the waste, bicycle riders commonly work against themselves. To keep the feet from slipping off, at least some force is applied against rising pedals.

The use of toe clips and straps permits foot position to be maintained without such counter force. With such devices skilled riders are able to apply force through both feet, simultaneously, by a lifting action on the rising pedal and the usual downward thrust on the other pedal. The outside of the rider's shoe contacts the clip for added power, instead of having resistance applied by sole of shoe against the upward moving pedal. The simple "push-push" action has advanced to a "push-pull" action of more skilled riders. Until my invention this technique was the extent of the pedaling efficiency achievable by the great majority of even serious bicyclists. My contribution to the art, however, makes it practical for most anyone to learn to move from the primative alternating impact on the pedals to the continuous rotational force applied to both pedals at all times thus most anyone can now be a most effective bicyclist.

Consistent with the laws of physics it is best to apply force which is tangential to the circle described by the rotating pedals. To accomplish this, it is necessary to reprogram the subconscious mind. To develop the co-ordination of mind, muscle and foot control, the learning-by-doing should be experienced one side at a time. This permits concentration without distraction due to the pedals moving in opposite directions. With one foot off the pedal and dangling, the mind is not free to concentrate on the desired learning process. A moving bike would further confuse the learning process.

SUMMARY OF THE INVENTION

I have overcome described impediments to the learning process by providing a device that lends itself to maximum concentration. Essentially my device consists of dual stationary foot rests or supports suitable for use next to each pedal of any of the well-known stationary exercising devices utilizing conventional bicycle type pedals and cranks.

BRIEF DESCRIPTION OF THE DRAWINGS

In the drawing forming a part hereof;

FIG. 1 depicts a perspective view of the preferred embodiment of my invention.

FIG. 2 is a view from the rear thereof showing the device in use.

FIG. 3 is a side elevation thereof showing the retention means of the stationary foot.

FIG. 4 is a diagram showing the direction of force to be accomplished when training with the device.

DESCRIPTION OF THE PREFERRED EMBODIMENT

Figure 5:
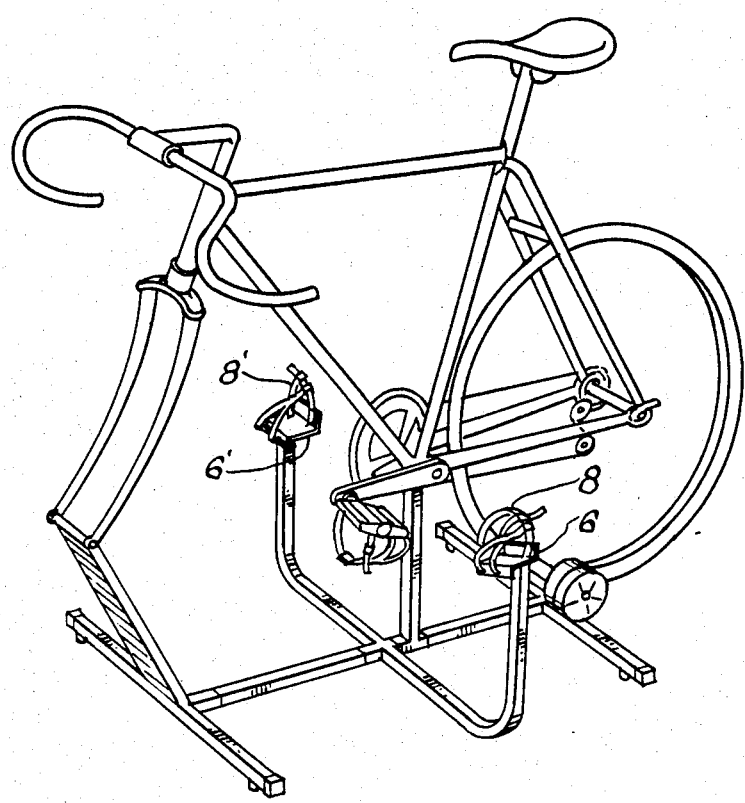
FIG. 5 is a modification of the device.

Referring again to the drawings, the numeral 10 represents a base member, preferably being a solid substantially rectangular plate of such size and dimensions that it will conveniently fit under the crank and pedals of the various forms of popular exercising devices such as Turbo-Trainers. It may be formed of any suitable material, such as plastic or wood.

As an important feature of my invention I have provided dual foot support means 6 and 6'. To avoid ankle twisting, the support means are tilted slightly inward as can best be seen in FIG. 2. They are essentially platforms on which the operator's foot may rest when not on the moving pedal. The position of the support means may vary in respect to the rotatable pedals. One end may be vertically disposed to pitch the foot forward and downward as shown in FIG. 3. This aids the learning of continuous tangential application of smooth force as illustrated by arrows 12 of FIG. 4.

Also each of the two support means is provided with foot securing means, being preferably conventional clips and straps designated as items 8 and 8' in the drawings.

Connecting the support means to the base plate are two upright arms 2 and 2'. They may be tilted slightly inward to align with the legs of the operator, as illustrated. The arms are spaced far enough apart to not contact the spinning pedals and yet close enough for comfortable use while the other foot is on the rotating pedal on the side opposite that of the rest being used.

Those skilled in the art may secure the arms to the plate in various ways. A plastic molded integrated unit is possible. I have devised a cross bar 4 having the arms as inwardly bent extensions at each end. The bar is bolted to the plate, with or without being recessed into a channel in the plate. This completes the preferred form of the invention.

A modification is shown in FIG. 5 of the drawings. In such form the base plate has been eliminated and the remaining parts become components of conventional bike simulators. As can be seen in the illustration, the base plate has been eliminated and the novel upright arms are connected to a conventional bike simulator. Other forms will be obvious to skilled designers without departing from the scope of my invention and the subjoined claims.

I claim:

1. In combination, a base member suitable for positioning under the mid-section of a conventional stationary bike simulator; two foot support means in a fixed space relationship in respect to each other over the base member whereby the pedals of the simulator may freely turn between them and dual upright arms each secured at one end to the base member and each having one of the support means mounted at the oposite end.

2. The claim according to claim one above wherein a foot retention means is affixed to each of the foot support means.

3. In combination, a conventional stationary bike simulator, two foot support means, one on each side of the simulator proximate to and outside the path described by rotating bike pedals, and dual upright arms connecting the suport means to the simulator.

* * * * *